UNITED STATES PATENT OFFICE.

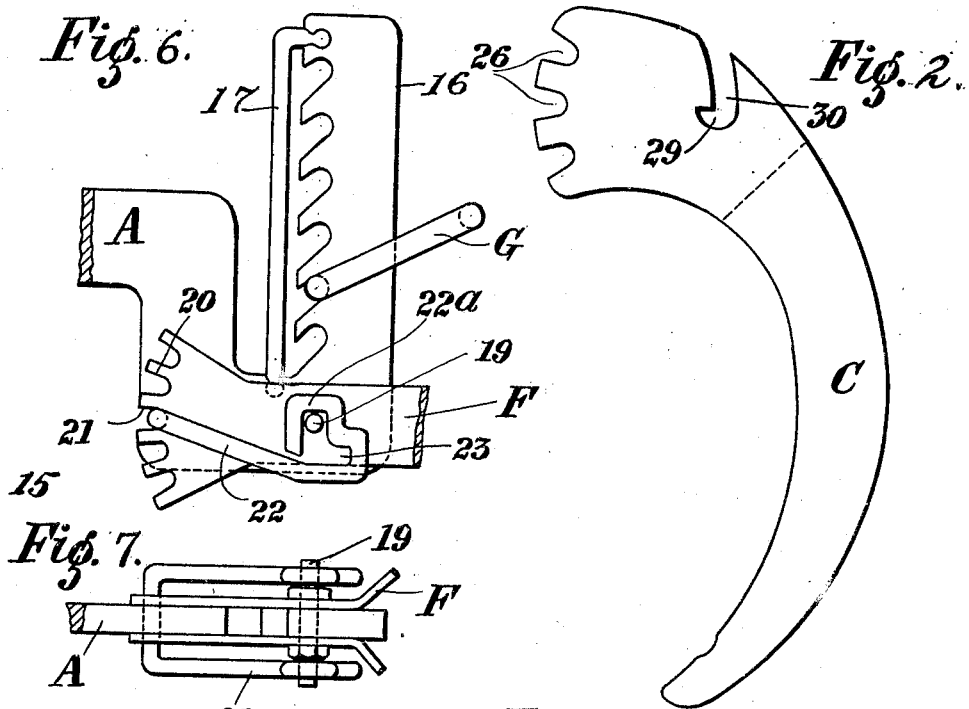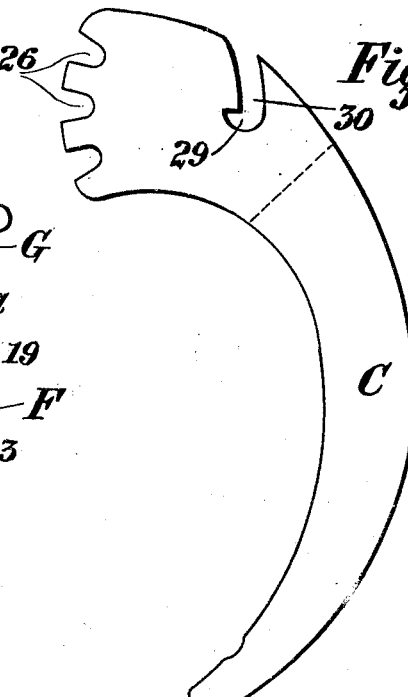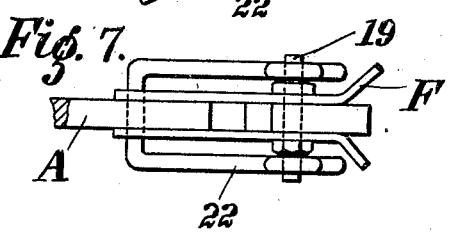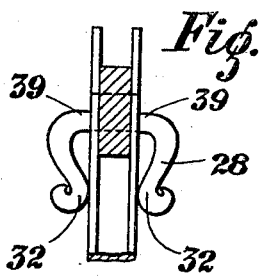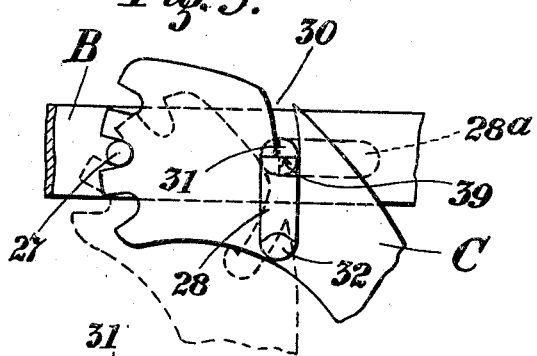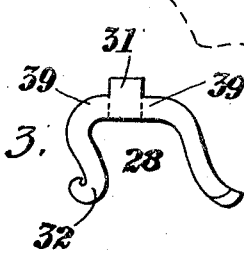

THOMAS ARCHIBALD MILLER BROWNLIE, OF LYALLPUR, PUNJAB, INDIA.

CULTIVATOR.

1,357,841.  Specification of Letters Patent.  Patented Nov. 2, 1920.

Application filed September 26, 1919. Serial No. 326,592.

*To all whom it may concern:*

Be it known that I, THOMAS ARCHIBALD MILLER BROWNLIE, of Lyallpur, Punjab, India, a subject of the King of Great Britain, have invented certain new and useful Improvements in Cultivators, of which the following is a specification.

This invention relates to cultivators such as hoes, harrows and the like, and its object is to provide improved means for attaching the tine and wheel standards to the cultivator frame so that they can be rapidly and easily adjusted relative to the ground to suit the different conditions of the soil.

Under this invention each standard is formed at the end with notches or openings one or other of which can be engaged by a stop or projection while the standard, with the notch or opening thus engaged, is adapted to be rigidly held relatively to the frame member by co-acting locking means.

According to one arrangement each tine carrying standard is detachably secured to the cultivator, with one or other of the notches engaged by a stop or projection on the frame, by means of a substantially U-shaped locking clip turnably supported in the frame and capable of engaging in a bayonet slot or equivalent formed in the standard. By placing one or other of the notches in engagement with the stop or projection and securing the standard by the locking clip in the manner stated, the tine carried by the standard can be set to different positions of inclination relative to the ground.

The wheel standard is pivoted to the central bar or member of the cultivator frame and is arranged to be locked in various positions to which it may be turned about the pivot in a similar manner to that adopted in securing the tine carrying standards. A U-shaped locking clip is employed, as before, but in this case the legs of the clip are made to form the bayonet slots into which the pivot projects while the base of the clip constitutes a stop or projection adapted to engage one or other of the notches or openings in the standard and a corresponding notch in the central bar or member with which they can be brought to register. By pushing the clip up about the pivot and then to the rear, this movement being made possible by means of the bayonet slots, the stop or projection constituted by the base of the clip is disengaged from the notches or openings leaving the standard free to be adjusted about its pivot after which it can be locked in position again by placing the base of the clip in engagement with the registering notches and moving the legs of the clip down over the pivot.

But in order that the invention may be more clearly understood and readily carried into effect or practice it will now be particularly described with reference to the annexed drawings, whereon:—

Figure 1 shows in side elevation an example of a cultivator having my improvements applied thereto.

Figs. 2, 3, 4 and 5 are detail views showing a tine carrying standard and the manner of connecting same to the cultivator.

Figs. 6 and 7 are views illustrative of the manner in which the wheel standard or bracket is adjustably secured to the central frame.

Referring to the drawings:—

B indicates the cultivator frame shown in this instance as comprising a central bar or member and two side bars or members adjustably secured thereto by parallel links 1, 1. C indicates the tine carrying standards with tines D thereon, E the usual leading wheel and F the wheel standard, G the draft link or ring and H the handles for guiding the cultivator.

For the purpose of detachably and adjustably securing the tine carrying standards C on the frame bars B each standard, as shown in Fig. 2, has its bifurcated upper end where it embraces the frame bar or member formed with notches or openings 26 one or other of which, according to the angle which it is required the tine shall make with the ground, is adapted to engage a stop or projection 27 (Figs. 1 and 5) on one of the frame members B. The standard is also made with bayonet slots in the bifurcated ends where it embraces the frame member and each such slot comprises an arcuate portion 30 and an undercut or semi-circular part 29.

The standard is adapted to be secured to the frame member by means of a U-shaped locking clip 28 (shown in detail at Fig. 3) which has a journal portion 31 adapted to be turnably supported in a hole or bearing in the frame member. The clip is shown in Fig. 3 ready for insertion into the hole in the member and it will be seen it has one leg only partially bent so as to facilitate the insertion. After insertion in the hole in the frame member this leg is bent to the same shape as the other (see Fig. 4). The clip is cut away or reduced on either side of the journal portion 31 to provide portions 39 of substantially semi-circular section corresponding to the parts 29 of the bayonet slots in the standard C.

To secure the tine carrying standard C to the frame member the clip 28 is first turned to the position shown in dotted lines 28ª, Fig. 5, whereupon with one or other of the notches 26 in engagement with the pin 27 the standard can be raised, from the position shown in dotted lines, by turning it about the axis of the pin 27 causing the semi-circular portions 39 of the clip 28 to pass into the portions 30 of the bayonet slots in the standard. After the standard has been raised as far as it will go the clip 28 is turned around so that the semi-circular portions 39 enter the correspondingly shaped undercut portions 29 of the slots thereby holding and locking the standard in the position shown in full lines. Preferably the ends or knobs 32 of the clip are so arranged as to press resiliently against the sides of the standard on either side of the frame member for the purpose of preventing the clip being accidentally turned to the disengaged position under vibration when the cultivator is at work. By simply turning the clip 28 the standard is released and can then be readily adjusted on one of the other notches 26 and thereafter locked in position again, as will be understood.

The wheel standard F is made adjustable on the central bar or member A of the frame in a similar fashion to the tine carrying standards C. As illustrated in Figs. 1, 6 and 7 the bifurcated end of the wheel standard F, which is pivoted at 19 to the forward end of the central bar or frame member, is formed with notches 20 adapted to register with a similar notch or opening 21 in the central bar or member. The standard can be locked in the various positions to which it may be adjusted about the pivot 10 by means of a U-shaped locking clip 22. The legs of the clip are bent up to form bayonet slots 22ª, 23, into which the pivot 19 projects on either side of the standard; while the base of the clip constitutes a stop or projection 15 adapted to engage the notch 21 in the central bar or member and whichever notch 20 in the standard F is brought to register therewith.

Assuming the standard F to be in the locked position, as illustrated, then when it is desired to free it for the purpose of adjustment the clip 22 is pushed upward after which, by reason of the portions 23 of the bayonet slots, it can be pushed backward over the pivot 10 so as to disengage the base which constitutes the stop or projection 15 from the registering notches 20, 21, whereupon the standard is left free to be turned about the pivot 10 to any other position required. The standard can then be locked again by operating the clip in the reverse manner as will be understood.

The draft link or ring G is in this case shown adjustable on a notched upright 16 on the central bar or member of the frame which upright is equipped with a rear bar 17 to prevent detachment of the link or ring.

It will be apparent that, under my invention as herein set forth, I provide improved means for attaching the tine and wheel standards to the cultivator frame so that they can be easily and rapidly adjusted to various positions to suit the different conditions of soil, etc. and, moreover, these adjustments can be effected without the use of spanner and like tools and without having to loosen screw bolts or nuts.

While I have shown and described preferred embodiments of my invention it will be understood by those skilled in the art that the invention is susceptible of modification in various particulars without departing from the spirit or scope thereof.

Having now fully described my invention what I claim and desire to secure by Letters Patent is:—

1. In a cultivator, adjustably securing the standards to the cultivator frame members by forming each standard at its end where it embraces the frame member with notches or openings one or other of which, according to the adjustment required, is engaged by a stop or projection the standard being rigidly held relative to the frame member with one or other of the notches thus engaged by co-acting locking means, substantially as set forth.

2. The combination with a cultivator frame, of a standard formed at one end where it engages the frame with a series of notches and means for adjustably securing the standard to the frame comprising a projection for engaging one or other of said notches and a locking device adapted to coöperate with said projection to hold the standard against movement relative to the frame.

3. The combination with a cultivator frame, of a bifurcated standard formed with notches at one end where it engages the frame, and means for adjustably securing the standard to the frame comprising a projection for engaging one or other of said notches and a releasable locking clip coöperating with said projection to hold the standard against movement relative to the frame.

4. In a cultivator, in combination, a standard formed at one end where it engages the cultivator frame with a series of notches and with a bayonet slot, and means carried by the cultivator frame for adjustably securing the standard thereto said means comprising a projection adapted to engage one or other of said notches according to the angle of inclination it is required the standard shall make with the ground, and a coacting locking clip for engaging the bayonet slot in the standard.

5. In a cultivator, in combination, a bifurcated standard formed at one end where it engages the cultivator frame with a series of notches and also with bayonet slots, and means for detachably and adjustably securing the standard to the frame said means comprising projections on the frame adapted to engage one or other pair of the notches in the standard and a substantially U-shaped clip pivotally carried by the frame and capable of engaging the bayonet slots in the standard.

6. In a cultivator, in combination, tine and wheel standards each bifurcated at its end and formed with a series of notches where it engages the cultivator frame, and U-shaped clips for adjustably securing the standards to the frame in conjunction with projections engaging the notches in said standards, substantially as set forth.

In testimony whereof I affix my signature in presence of two witnesses.

THOMAS ARCHIBALD MILLER BROWNLIE,

Witnesses:
   W. NOLAN,
   PARS RAU.